United States Patent [19]
Morrison

[11] Patent Number: 5,764,331
[45] Date of Patent: Jun. 9, 1998

[54] COMBINATION OF SPECTACLE LENSES AND FRAMES THEREFOR

[75] Inventor: James W. Morrison, Sarasota, Fla.

[73] Assignee: Morrison International, Inc., Sarasota, Fla.

[21] Appl. No.: 680,415

[22] Filed: Jul. 15, 1996

Related U.S. Application Data

[63] Continuation-in-part of Ser. No. 342,872, Nov. 21, 1994, abandoned, which is a continuation-in-part of Ser. No. 188,716, Jan. 28, 1994, abandoned, which is a continuation-in-part of Ser. No. 886,379, May 21, 1992, abandoned.

[51] Int. Cl.$^6$ .................................. G02C 1/00; G02C 5/00
[52] U.S. Cl. .............................. 351/41; 351/86; 351/154
[58] Field of Search ............................. 351/41, 86, 96, 351/154, 83, 159, 174, 178

[56] References Cited

U.S. PATENT DOCUMENTS

| | | | |
|---|---|---|---|
| 1,721,170 | 7/1929 | Wrighton | 351/86 |
| 4,196,982 | 4/1980 | Watkins | 351/86 |

FOREIGN PATENT DOCUMENTS

| | | | |
|---|---|---|---|
| 0041910 | 12/1981 | European Pat. Off. | 351/178 |

Primary Examiner—Huy Mai
Attorney, Agent, or Firm—Robert A. Green

[57] ABSTRACT

The disclosure is of a lens having a bevelled rim and a frame having a channel for receiving the lens and carrying a bevel which is complementary to the bevel of the lens. The lens also carries on its rim a plurality of wedge-like positioning members which grip the channel of the frame and essentially lock the lens in place so that it cannot rotate.

12 Claims, 4 Drawing Sheets

COMBINATION OF SPECTACLE LENSES AND FRAMES THEREFOR

CROSS REFERENCE TO RELATED APPLICATIONS

This application is a continuation in part of application Ser. No. 08/342,872 filed Nov. 21, 1994 now abandoned as a continuation in part of application Ser. No. 08/188,716 filed Jan. 28, 1994 now abandoned as a continuation in part of application Ser. No. 07/886,379 filed May 21, 1992 now abandoned.

BACKGROUND OF THE INVENTION

This invention relates to the manufacture of inexpensive frame and lens assemblies wherein a lens is molded directly in usable form and it is coupled to a specially shaped frame. The lens includes molded positioning members which essentially lock the lens in place in the frame. The lens also includes means for readily orienting the lens in the desired rotation for a particular patient's needs.

SUMMARY OF THE INVENTION

The present invention provides a method of molding a spectacle lens in finished form so that it can be inserted directly into a frame. Both the frame and lens are shaped to permit coupling with a minimum amount of processing. Thus mass production is made possible. The lens includes positioning and locking means for holding the lens in place in the frame after it has been oriented as required and inserted in the frame.

The lens also includes on its surface a small mark which is used in providing the required orientation of the lens in a frame for the patient's prescription.

DESCRIPTION OF THE INVENTION

The present invention relates to the simplification of the manufacture of lenses and spectacle assemblies. The current art of making lenses is to mold an oversize blank without a finished usable edge and then grind the edge of the blank to the required size and shape. The ground lens is then inserted in a frame. This is clearly a relatively inaccurate and time-consuming method of manufacturing a lens for insertion in a frame.

Figure 1:
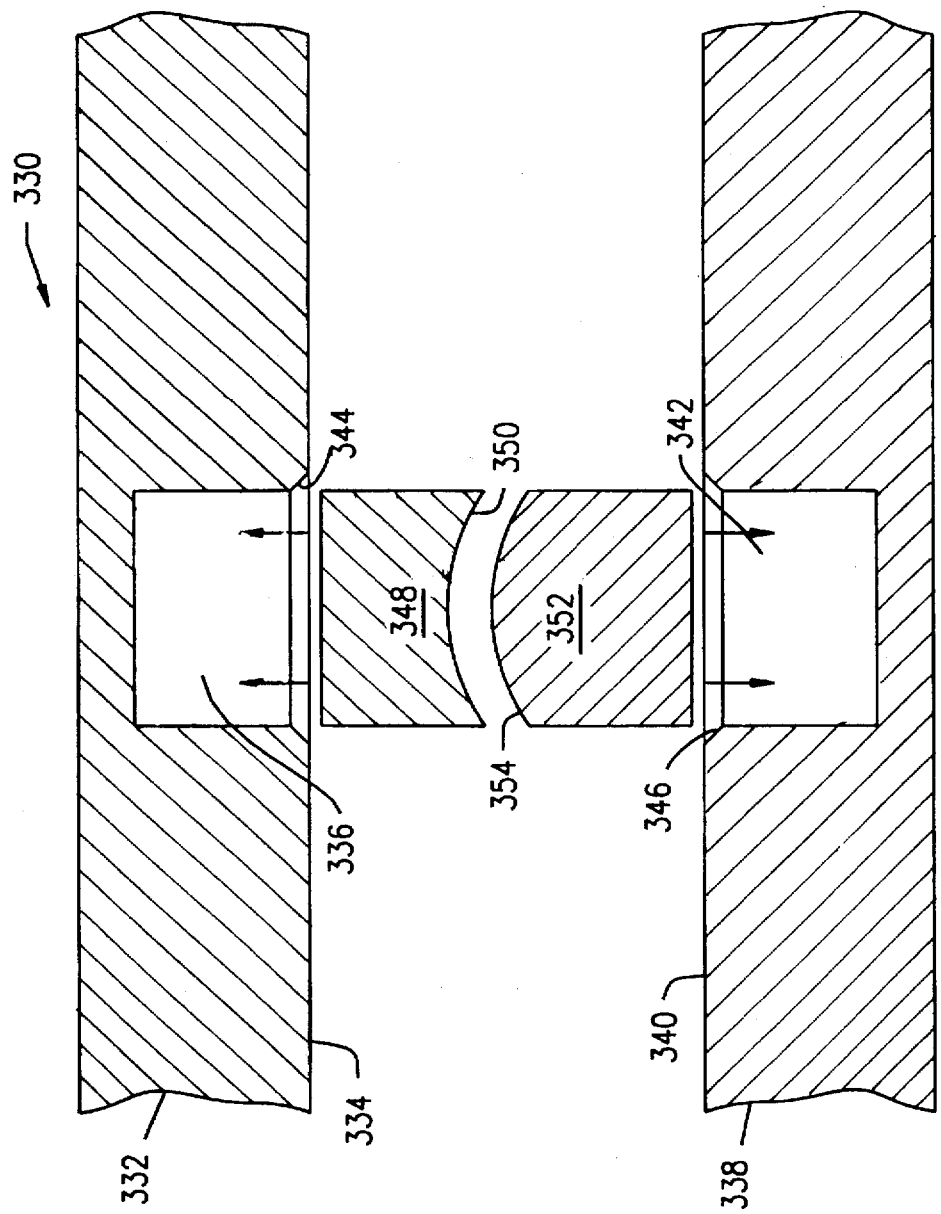
FIG. 1 is a side elevational view of a mold used in making lenses embodying the invention.

According to the invention, referring to FIG. 1, a two-part mold 330 is provided in which a lens of the desired shape and size is molded with the desired final edge bevel formed at the same time. The mold 330 has an upper portion 332 which has a smooth, flat bottom wall 334. The mold portion 332 has a relatively deep recess 336 which has the same diameter and shape as that desired for the finished lens. The mold 330 includes a lower portion 338 having a smooth flat upper wall 340. The second portion 338 has a relatively deep recess 342 having a diameter and shape the same as that of the desired finished lens. The two recesses 336 and 342 are vertically aligned with each other. The planar lower surface of the upper mold portion and the planar upper surface of the lower mold portion meet and form a tight fit when the two parts are assembled.

The recesses may be in individual plugs inserted in the two mold portions.

According to the invention, the recess 336 has an annular bevel 344 at its lower end and the recess 342 has an annular bevel 346 at its upper end. The two bevelled surfaces are complementary, that is they both slant outwardly from the vertical axis of the recesses toward the planar surfaces 334 and 340 of the mold portions.

In operation of the invention, a first insert 348 of metal, plastic or the like adapted for insertion into the upper recess 336 has a lower surface 350 having a shape for forming the outer surface 356 of a lens 358 (FIG. 3.) to the desired shape for the patient's prescription. The mold includes a second insert 352 of a similar material as the first insert, for insertion into the lower recess 342. The second insert has an upper surface 354 shaped to form the inner surface 360 of the lens 358 to the desired shape for the patient's prescription.

The mold is also provided with other parts, not shown because of size limitations. These parts are shown and described below and they are integral with a lens and they are used for positioning and locking a lens in a frame.

Figure 2:
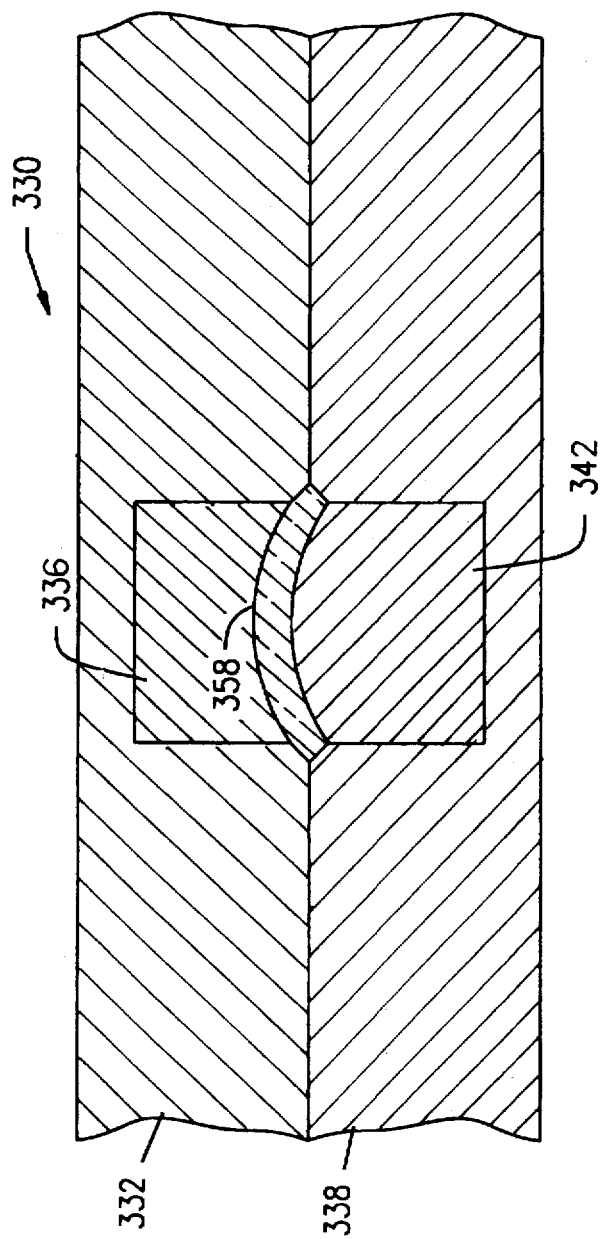
FIG. 2 is a side elevational view of the apparatus of FIG. 1.

With the parts of the mold and inserts assembled as shown in FIG. 2, the desired lens material, usually a plastic, in molten form, is fed into the mold and the lens 358 is formed having the desired final size and shape and having a bevelled edge 362, embodying the invention, which permits it to be inserted directly into a frame 364 with no grinding or other treatment.

Figure 3:
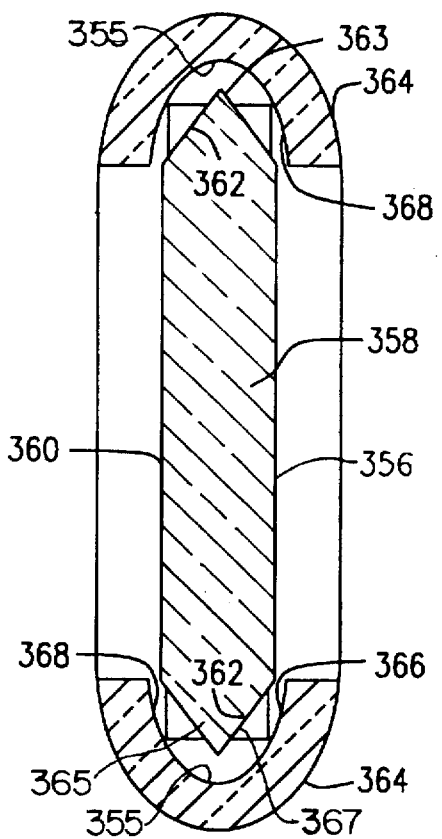
FIG. 3 is a side elevational view of a lens embodying the invention mounted in a frame, a portion of which is shown schematically.
Figure 5:
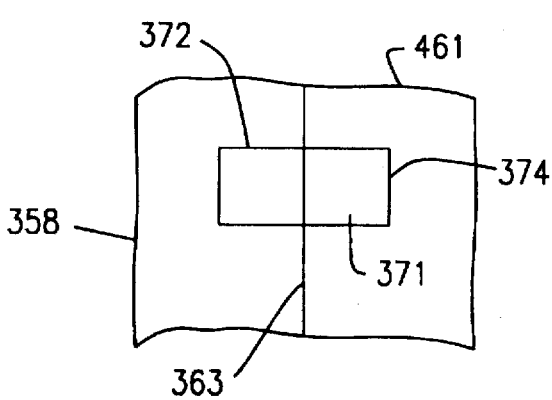
FIG. 5 is a plan view of a portion of the lens of FIG. 4.

Referring to FIG. 3, The inner rim of the lens receiving portion of the frame 364 has channel 365 for receiving the lens and the channel 355 has a bevel 368 which matches or complements the bevel of the lens as illustrated to hold the lens in place.

In order to further enhance the relationship between the lens and the frame 364, the bevelled lens 358 is provided along its periphery with a plurality of positioning means 361 which serve to dig into the frame (usually of a synthetic resinous material) to thereby, in effect, lock the lens in place in the frame so that it cannot rotate once properly positioned. As noted above, the bevelled lens 358 includes a bevelled edge or periphery 362 which has sloped or slanted side walls 365 and 367 which extend to and terminate in a generally pointed edge or tip 363.

According to the invention, the positioning means 361 comprises, referring to FIGS. 3 to 6, two generally triangular wedge-like members 372 and 374 each of which has walls 371 and 373 which are oriented perpendicular to each other and define a generally sharp edge 375. The walls 371 of a pair of wedge-like members are coplanar and form a plane which lies just below the tip 363 of the bevelled edge 362 of the lens 358.

In practising the invention, a lens and frame are dimensioned so that the lens is placed in the annular channel 355 and forced into engagement with the inner wall of the channel of the frame and the relatively sharp edges 375 of the positioning wedges are forced into the plastic material of the frame and firmly engage the frame. Thus, once the lens is in place, it cannot rotate.

Figure 6:
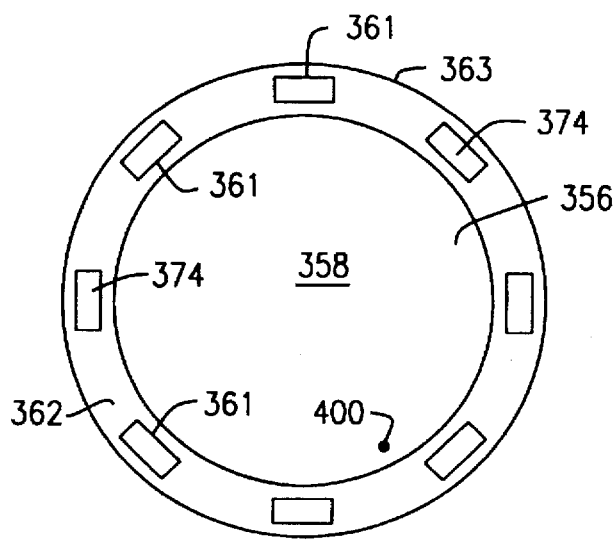
FIG. 6 is a front elevational view of a lens embodying the invention.
Figure 7:
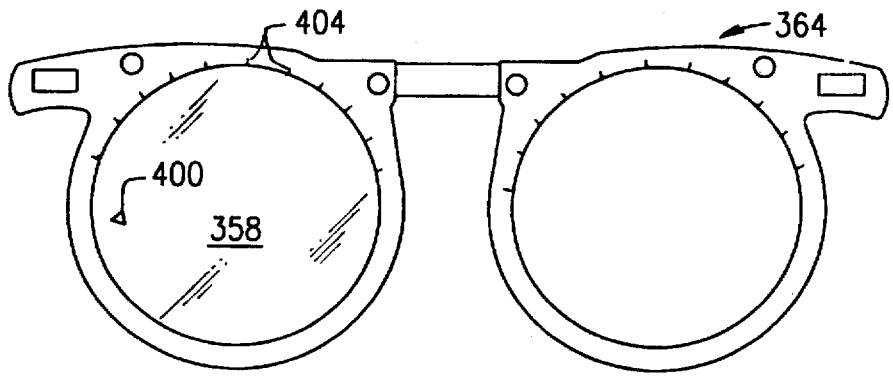
FIG. 7 is a front elevational view of a lens inserted in a frame.
Figure 4:
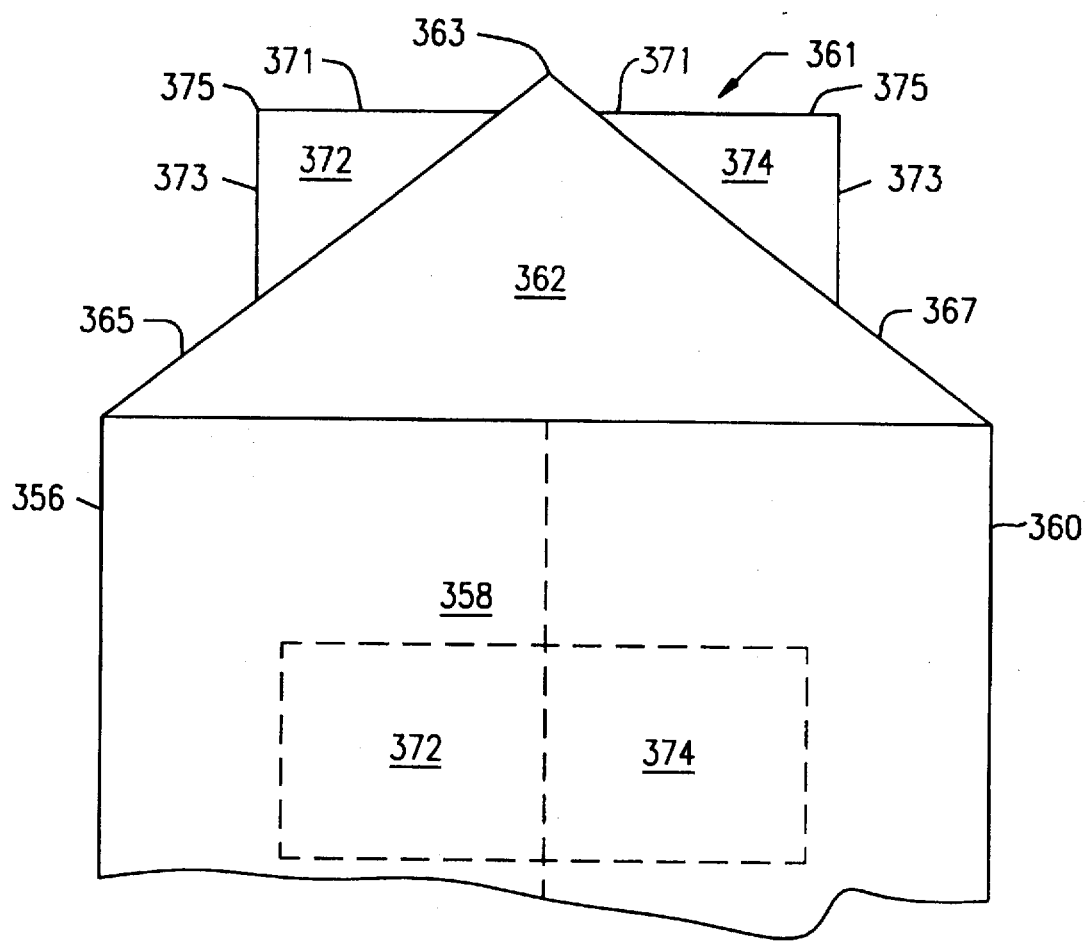
FIG. 4 is a side elevational view, enlarge,d of a portion of a lens embodying the invention.

Another feature of the lens of the invention, referring to FIGS. 6 and 7 is the provision of a small dot 400, perhaps 0.25 mm in diameter, on the lens within a few millimeters of the bevelled edge. This dot is formed when the lens is molded and is barely visible. In one method of using the dot 400, the dot is placed at the zero degree point of a cylindrical lens and the lens 358 is rotated in the frame 364 so that the dot is aligned with the appropriate degree of the patient's axis when it is placed in the frame 364. This is illustrated in U.S. Pat. No. 5,459,534 which is incorporated herein by reference.

As shown in FIG. 7, the frame 364 carries markings 404 which represent degrees of angular rotation in the frame. Normally, the zero degree point of a cylindrical lens is at the lowest point on the surface of the lens which is formed by two curves which are ninety degrees apart.

The dot 400 is made preferably by forming a small depression in the mold used to form the lens and this depression is filled with plastic when the lens is molded and this plastic dot forms the dot 400 on the lens.

I claim:

1. An eyeglass assembly comprising a lens having a bevelled rim and a spectacle frame having a channel including walls, said channel having the substantially exact size and shape of said lens and having a complimentarily bevelled rim for receiving the bevelled rim of said lens, the assembly of said lens and frame requiring no lens grinding, a plurality of positioning members disposed along the periphery of said lens, said positioning members including means for gripping the wall of said channel in said frame when said lens is inserted in said channel whereby said lens is held firmly in place and cannot rotate, the bevel of said rim of said lens being formed by two tapered walls which terminate in a tip and said positioning members comprise wedge-like bodies secured to said tapered walls adjacent to said tip of said rim of said lens, and each positioning member comprising two wedge-like bodies each of which includes two tapered walls disposed perpendicular to each other, one wall of one member being coplanar with the corresponding wall of the other member and the two coplanar walls forming a plane which lies just below the tip of the rim of the lens.

2. The assembly defined in claim 1 wherein said walls of each wedge-like member are joined along a line which engages and presses into the channel of the lens receiving portion of said frame.

3. A spectacle lens comprising a disc of a transparent material, a bevelled edge formed on said disc, and a plurality of positioning and gripping members formed along the edge of said disc, said members having a line-like linear portion which is adapted to press into a spectacle frame when the lens is inserted into the frame.

4. The lens defined in claim 3 wherein said lens has a zero axis and including on the surface of said lens a small spot located on the zero axis of the lens and adapted to be used to provide the desired rotation of the lens when it is mounted in the frame.

5. A combination of eyeglass frame and lenses therefor including an eyeglass frame having at least one opening for receiving a lens, said opening being defined by a ring-like lens holder having a channel in which a lens is seated, said channel being defined by frame walls between which a lens is held in place, the surface of said channel being smooth and substantially free of protrusions therefrom, a lens seated in said channel, said lens having a peripheral surface which lies in said channel in operative relation with said frame walls of said channel, and at least two protrusions being spaced apart along said peripheral surface of said lens and rising therefrom, each of said protrusions having a relatively sharp edge which presses into and securely engages the frame walls of said channel in said frame.

6. The assembly defined in claim 5 wherein said peripheral surface of said lens is its edge and is bevelled, the bevel of the edge of said lens being formed by two slanted walls which terminate in a line at the edge of the lens, said protrusions being formed and spaced apart along said two slanted walls at the edge of the lens.

7. The assembly defined in claim 5 wherein said peripheral surface of said lens is bevelled and the wall of said channel in said frame includes two side walls which are spaced apart at an angle to each other to form a bevel which is complementary to the bevel of said peripheral surface of said lens.

8. The assembly defined in claim 7 wherein each protrusion from the peripheral surface of said lens includes a sharp edge which engages one of said frame walls which form the bevel of said channel in said frame.

9. The assembly defined in claim 8 wherein each protrusion comprises two wedge-like bodies disposed one on one sloping wall of the bevel of said lens and the other being disposed on the other sloping wall of the bevel of the lens.

10. The assembly defined in claim 5 wherein said lens is generally circular and its edge defines a generally circular line, and said protrusions are disposed in pairs, one member of the pair being on one side of said circular line defined by said edge of said lens and the other being on the other side of said circular line defined by said edge of said lens.

11. The assembly defined in claim 10 wherein in a pair of protrusions, the members of the pair are disposed side by side adjacent to each other.

12. A combination of eyeglass frame and lens including;

an eyeglass frame having a lens receiving portion including a channel for receiving a lens, said channel having a smooth surface, a lens seated in said channel in said lens receiving portion of said frame, said lens having an edge, and a plurality of frame-gripping protrusions on said edge of said lens, said protrusions pressing into and engaging said smooth surface of said channel in said lens receiving portion of said frame.

* * * * *